United States Patent
Lorell et al.

(10) Patent No.: US 10,189,580 B2
(45) Date of Patent: Jan. 29, 2019

(54) IMAGE STABILIZATION AND POINTING CONTROL MECHANIZATION FOR AIRCRAFT IMAGING SYSTEMS

(71) Applicant: Aerobo, Brooklyn, NY (US)

(72) Inventors: Kenneth R. Lorell, Los Altos, CA (US); Jean-Noël Aubrun, Mountain View, CA (US); Brian Streem, Brooklyn, NY (US)

(73) Assignee: Aerobo, Brooklyn, NY (US)

( * ) Notice: Subject to any disclaimer, the term of this patent is extended or adjusted under 35 U.S.C. 154(b) by 0 days.

(21) Appl. No.: 15/625,770

(22) Filed: Jun. 16, 2017

(65) Prior Publication Data

US 2018/0362183 A1    Dec. 20, 2018

(51) Int. Cl.

| G03B 15/00 | (2006.01) |
| B64D 47/08 | (2006.01) |
| G03B 17/56 | (2006.01) |
| B64C 39/02 | (2006.01) |
| F16M 11/12 | (2006.01) |

(Continued)

(52) U.S. Cl.
CPC ............ *B64D 47/08* (2013.01); *B64C 39/024* (2013.01); *F16M 11/123* (2013.01); *F16M 11/18* (2013.01); *F16M 13/02* (2013.01); *G03B 15/006* (2013.01); *G03B 17/561* (2013.01); *B64C 2201/027* (2013.01);
(Continued)

(58) Field of Classification Search
CPC ...................................................... G03B 15/00
USPC .......................................................... 396/13
See application file for complete search history.

(56) References Cited

U.S. PATENT DOCUMENTS

| 3,760,377 A | 9/1973 | Attridge et al. |
| 3,944,729 A | 3/1976 | Tsoubanos |

(Continued)

FOREIGN PATENT DOCUMENTS

| WO | WO 2007/033033 | 3/2007 |
| WO | WO-2016/094964 A1 | 6/2016 |

OTHER PUBLICATIONS

Nicholas J. Brake, 'Control System Development for Small UAV Gimabal, Requirements for the Degree Master of Science in Aerospace Engineering', , California Polytechnic State University, Aug. 2012, 113 pages.*

(Continued)

*Primary Examiner* — Clayton E Laballe
*Assistant Examiner* — Kevin Butler
(74) *Attorney, Agent, or Firm* — Morgan, Lewis & Bockius LLP (57) ABSTRACT

An imaging device can be mounted on a vehicle and used to capture images. The imaging device can include a camera assembly rotatable relative to a platform of the vehicle and about two or three camera axes. The camera assembly can include a camera and a mirror attached to the camera. The mirror can be rotatable relative to the camera and about one or two mirror axes, different from the camera axes. Users can provide input to controllers that operate the vehicle, the camera, and the mirror to control both flight and the line-of-sight of the camera. The controllers combine separate inputs as well as measured conditions, such as inertial angles, to coordinate control of vehicle, camera, and mirror parameters, such as yaw adjustments to both the camera and the mirror to achieve a desired line-of-sight.

20 Claims, 11 Drawing Sheets

(51) Int. Cl.
*F16M 11/18* (2006.01)
*F16M 13/02* (2006.01)

(52) U.S. Cl.
CPC .. *B64C 2201/108* (2013.01); *B64C 2201/127* (2013.01); *B64C 2201/146* (2013.01)

(56) References Cited

U.S. PATENT DOCUMENTS

| | | | |
|---|---|---|---|
| 4,002,830 | A | 1/1977 | Brown et al. |
| 4,155,096 | A | 5/1979 | Thomas et al. |
| 4,404,592 | A | 9/1983 | Pepin et al. |
| 4,615,509 | A | 10/1986 | Biass |
| 4,643,539 | A | 2/1987 | Brignall |
| 4,688,091 | A | 8/1987 | Kamel et al. |
| 4,883,347 | A | 11/1989 | Fritzel |
| 5,793,541 | A | 8/1998 | Cattan et al. |
| 6,576,891 | B2 | 6/2003 | Ansley |
| 6,747,686 | B1 | 6/2004 | Bennett |
| 7,597,489 | B2 | 10/2009 | Horak et al. |
| 7,679,530 | B2 | 3/2010 | Waquet |
| 8,434,920 | B2 | 5/2013 | Jones |
| 8,635,938 | B2 | 1/2014 | King et al. |
| 9,041,898 | B1 | 5/2015 | Reilly et al. |
| 9,121,758 | B2 | 9/2015 | Cook |
| 9,347,743 | B2 | 5/2016 | Martin et al. |
| 9,429,953 | B1* | 8/2016 | Miller .................. G05D 1/0676 |
| 2006/0017816 | A1 | 1/2006 | Gat |
| 2009/0260511 | A1 | 10/2009 | Melnychuk et al. |
| 2009/0278932 | A1 | 11/2009 | Yi |
| 2014/0034775 | A1* | 2/2014 | Hutson .................. B64C 39/024 244/17.17 |
| 2014/0034776 | A1* | 2/2014 | Hutson .................. B64D 45/00 244/17.17 |
| 2014/0049643 | A1 | 2/2014 | Segerstrom et al. |
| 2014/0362177 | A1 | 12/2014 | Dunn |
| 2016/0127641 | A1* | 5/2016 | Gove .................... G06T 1/0007 348/143 |
| 2016/0198088 | A1 | 7/2016 | Wang et al. |
| 2016/0236638 | A1* | 8/2016 | Lavie .................... H04N 7/185 |
| 2017/0036771 | A1* | 2/2017 | Woodman ............ B64D 27/26 |
| 2017/0045894 | A1* | 2/2017 | Canoy .................. G05D 1/101 |
| 2017/0050749 | A1* | 2/2017 | Pilskalns ............... B64F 1/362 |
| 2017/0067734 | A1* | 3/2017 | Heidemann ......... G01B 11/2513 |
| 2017/0081014 | A1* | 3/2017 | Stock ........................ B64C 1/22 |
| 2017/0163896 | A1* | 6/2017 | Kang .................. H04N 5/23287 |
| 2017/0235018 | A1* | 8/2017 | Foster .................. G01V 99/005 702/5 |
| 2017/0355453 | A1* | 12/2017 | Kim ........................ B64C 25/24 |

OTHER PUBLICATIONS

Ella Atkins et al., 'Unmanned Aircraft Systems', Wiley Publications, 2016, 73 pages.*
Piotr Rudol, 'Increasing Autonomy of Unmanned Aircraft Systems Through the Use of Imaging Sensors', Linkiping University, 2011, 115 pages.*
International Search Report and Written Opinion from PCT/US2018/037905, dated Oct. 23, 2018, 15 pages.

* cited by examiner

IMAGE STABILIZATION AND POINTING CONTROL MECHANIZATION FOR AIRCRAFT IMAGING SYSTEMS

TECHNICAL FIELD

The subject technology relates to controllable imaging assemblies and in particular to image stabilization and pointing control mechanization for aircraft imaging systems.

BACKGROUND OF THE DISCLOSURE

Aerial cinematography is a common feature of modern films. A camera can be mounted to an airborne vehicle, and images can be captured by the camera during flight. The position and orientation of the vehicle can be controlled, and the orientation of the camera with respect to the vehicle can also be controlled. Aerial cinematography can be a complicated and expensive undertaking using conventional technology. The high quality camera(s) and lenses are heavy and bulky and require at least one skilled operator for focus, pointing, and zoom control. The airborne platform can require at least one pilot, can generate excessive noise, can be difficult to coordinate with action on the ground or other aerial vehicles, and can be very expensive to operate.

BRIEF DESCRIPTION OF THE DRAWINGS

The accompanying drawings, which are included to provide further understanding of the subject technology and are incorporated in and constitute a part of this description, illustrate aspects of the subject technology and, together with the specification, serve to explain principles of the subject technology.

DETAILED DESCRIPTION

In the following detailed description, specific details are set forth to provide an understanding of the subject technology. It will be apparent, however, to one ordinarily skilled in the art that the subject technology may be practiced without some of these specific details. In other instances, well-known structures and techniques have not been shown in detail so as not to obscure the subject technology.

Figure 1:
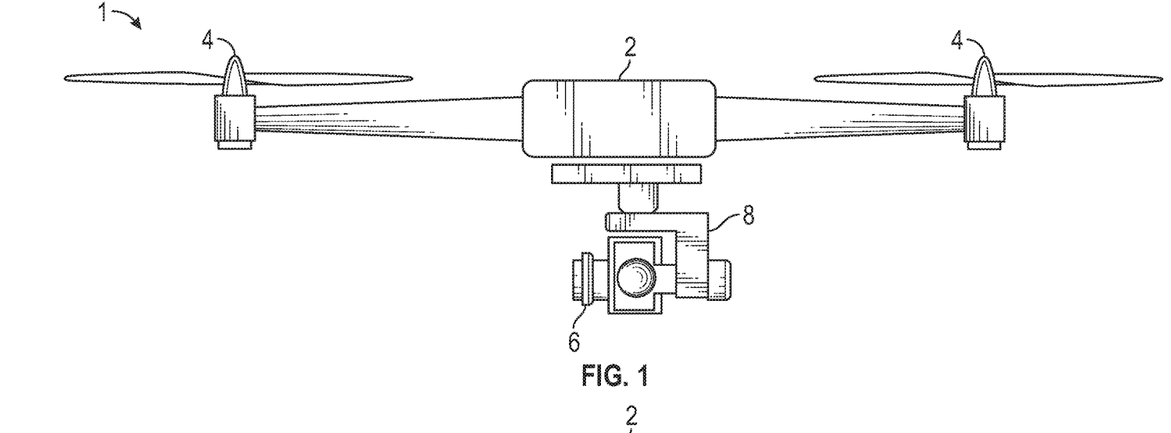
FIG. 1 is a side view of an exemplary vehicle having a camera assembly, according to some embodiments of the subject technology.
Figure 2:
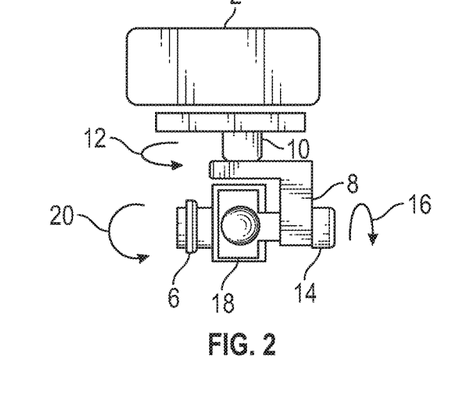
FIG. 2 is a side view of a portion of the vehicle of FIG. 1, according to some embodiments of the subject technology.

As shown in FIG. 1, an airborne vehicle 1 can include propellers 4 that provide flight capabilities to the airborne vehicle 1. A platform 2 of the vehicle 1 can support a camera assembly 8 that controls orientation of a camera 6 relative to the platform 2. As shown in FIG. 2, the camera assembly 8 can include a gimbal device that rotates the camera 6 in multiple axes. For example, the camera assembly 8 can include a three-axis gimbal that includes a yaw axis motor 10, a roll axis motor 14, and a pitch axis motor 18. The yaw axis motor 10 can rotate the camera 6 in a yaw rotation 12 about a yaw axis, the roll axis motor 14 can rotate to the camera 6 in a roll rotation 16 about a roll axis, and the pitch axis motor 18 can rotate the camera 6 in a pitch rotation 20 about a pitch axis. Such rotation can allow the camera 6 to achieve a wide variety of orientations with respect to the platform 2 of the vehicle 1.

The arrangement shown in FIGS. 1 and 2 can accommodate a variety of cameras 6, which can be oriented with respect to and independently of the platform 2. In order to reduce the cost of equipment and personnel as well as address difficult coordination between the camera 6 and the subjects to be imaged, operators have used commercially available remotely-piloted vehicles carrying digital cameras. These vehicles, commonly referred to as "drones" are relatively small, inexpensive, and can carry high (e.g., 4K) resolution video cameras, roughly the size of a conventional 35 mm SLR. A 3-axis gimbal can facilitate 360 degrees of azimuth motion and +/−90 degrees of elevation motion. The roll axis can be stabilized so that the camera 6 always remains level with the horizon. Video images can be stored on-board the vehicle 1 in digital memory and/or be transmitted to the ground so that the camera operator can point at and track the desired subjects. Coordination between the director, the pilot, the camera operator, and the subjects is considerably easier and less expensive than with the conventional technique of using manned aircraft or helicopter systems Cameras of high quality may be required for some (e.g., cinematic) applications. Due to weight and size requirements, these cameras may not be practical for the size of many vehicle and gimbal systems. Furthermore, a simple gimbal system may not provide other desired capabilities, such as the ability to zoom the image frame in and out, as well as change focus and exposure during filming. While the high quality camera/lens systems and focus/zoom/exposure features are more easily achieved when the camera(s) are flown in a manned vehicle, the capabilities and quality of systems that are practical for drone-borne systems are limited to fixed focus, auto-exposure control, and cannot be zoomed. Furthermore, because of weight, power, and the physical constraints of control system dynamics, the current drone-borne systems must be much smaller, lighter weight and of lower moment of inertia than true professional-quality systems.

Embodiments of the present disclosure can provide a lightweight, low-power, highly versatile gimbal system that is practical for flight on drones and is capable of stabilizing and pointing high-quality camera/lens systems (i.e., camera/lens systems that are substantially larger, heavier, and more capable than the camera/lens systems currently available for drone applications). Embodiments of the present disclosure can provide rapid orienting capabilities for altering a view in response to user controls.

Figure 3:
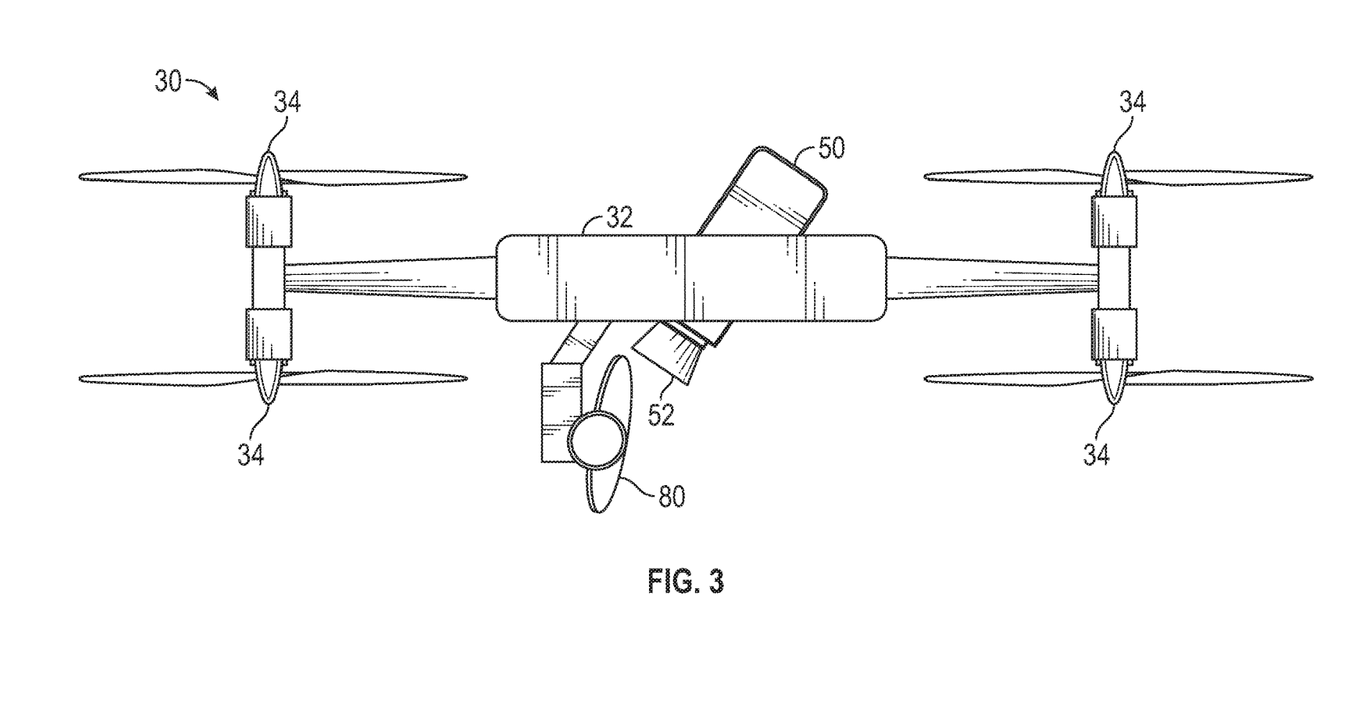
FIG. 3 is a side view of an exemplary vehicle having a camera assembly, according to some embodiments of the subject technology.

According to some embodiments, for example as shown in FIG. 3, a vehicle 30 can support a camera assembly 50. The vehicle 30 can be an airborne vehicle that is provided with one or more propellers 34 or other propulsion devices. A platform 32 of the vehicle 30 can support a camera assembly 50 that includes a camera 52 and a mirror 80.

Figure 4:
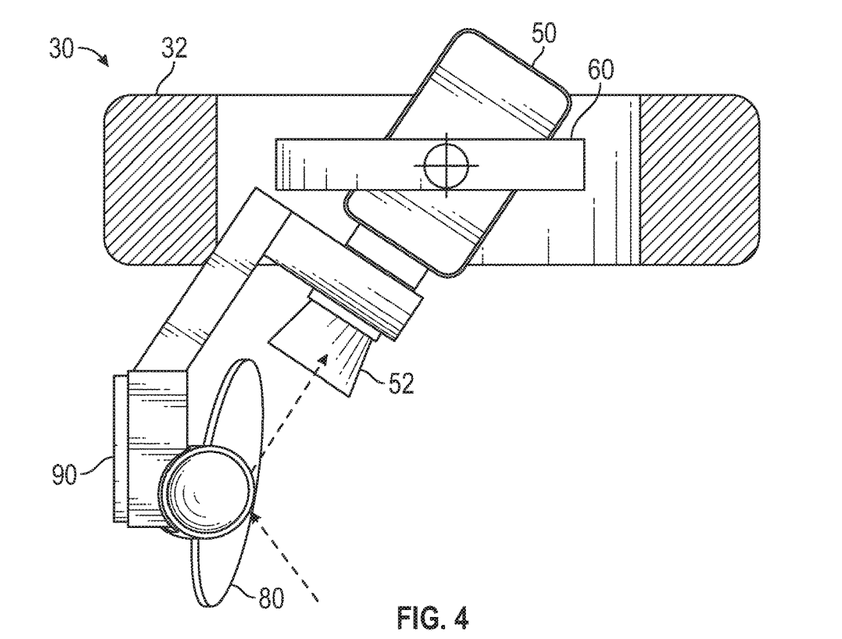
FIG. 4 is a side view of a camera assembly of the vehicle of FIG. 3, according to some embodiments of the subject technology.

According to some embodiments, for example as shown in FIG. 4, the mirror 80 can reflect an image to the camera 52 for capture and recording by the camera 52. The mirror can be planar, elliptical, or another shape. The camera 52 can be oriented toward the mirror 80 to receive the reflected image.

A gimbal assembly 60 can control an orientation of the camera assembly 50, including the camera 52, relative to the platform 32. The gimbal assembly 60 can rotate the camera assembly 50, including the camera 52, in one or more axes, as further described herein. The mirror assembly 90, including the mirror 80, can be rotated as part of and along with the camera assembly 50. For example, the mirror assembly 90 can extend from the camera 52 and mechanically connect the mirror 80 to the camera 52. Accordingly, as the gimbal assembly 60 alters the orientation of the camera assembly 50, the camera 52 can remain directed toward the mirror 80. For example, an optical axis of the camera 52 can intersect the mirror 80. By further example, the optical axis of the camera 52 can intersect a center of mass and/or one or more axes of rotation of the mirror 80. The camera 52 can capture at least a portion of the reflected image from the mirror 80. The reflected image from the mirror 80 can be at least a portion of the image captured by the camera 52.

Figure 5:
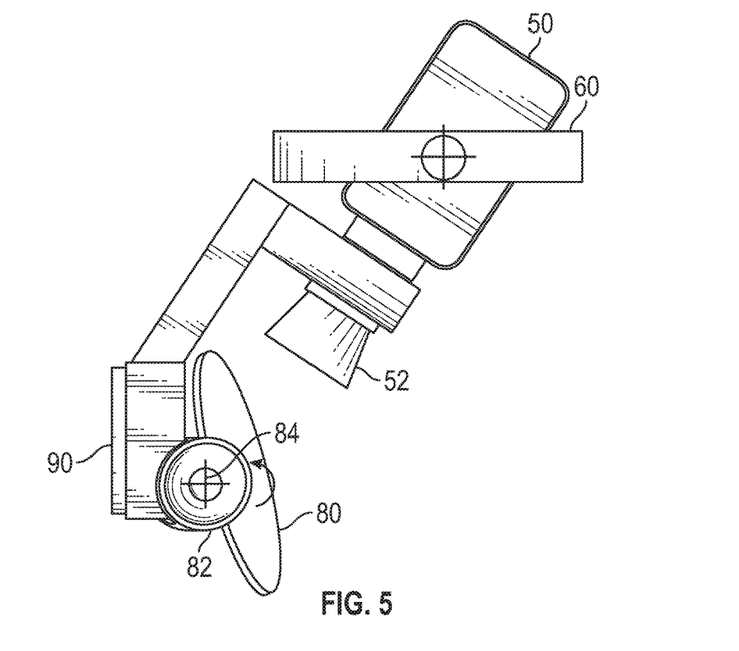
FIG. 5 is a side view of a camera assembly of the vehicle of FIG. 3, according to some embodiments of the subject technology.

According to some embodiments, for example as shown in FIG. 5, the mirror assembly 90 can control an orientation of the mirror 80 relative to the camera 52. Accordingly, adjustment of the orientation of the mirror 80 can alter the reflected image directed to the camera 52. The mirror assembly 90 can control an orientation of the mirror 80 in one or more (e.g., two) axes. For example, a mirror pitch motor 82 can rotate the mirror 80 about a mirror pitch axis 84. The mirror pitch axis 84 can be an axis that is at least substantially parallel to the ground when the platform 32 of the vehicle is level with the ground. Adjustment of the mirror 80 about the mirror pitch axis 84 can tilt the reflected image upward or downward with respect a horizon, such that different views along an elevation can be reflected and captured. The mirror can move in pitch, for example, by ± about 45 or more degrees so the camera line-of-sight can be steered in pitch by ± about 90 or more degrees. The mirror can move in pitch by small angles with a bandwidth of, for example, 20 Hz in order to compensate for residual pitch errors from a camera control system.

Alternatively or in combination, the mirror assembly 90 can control the orientation of the mirror 80 in another axis, such as a mirror yaw axis (not shown). The mirror yaw axis can be orthogonal to the mirror pitch axis 84. The axes can be mutually orthogonal. The axes can intersect the mirror 80 and/or a center of mass of the mirror 80.

Figure 6:
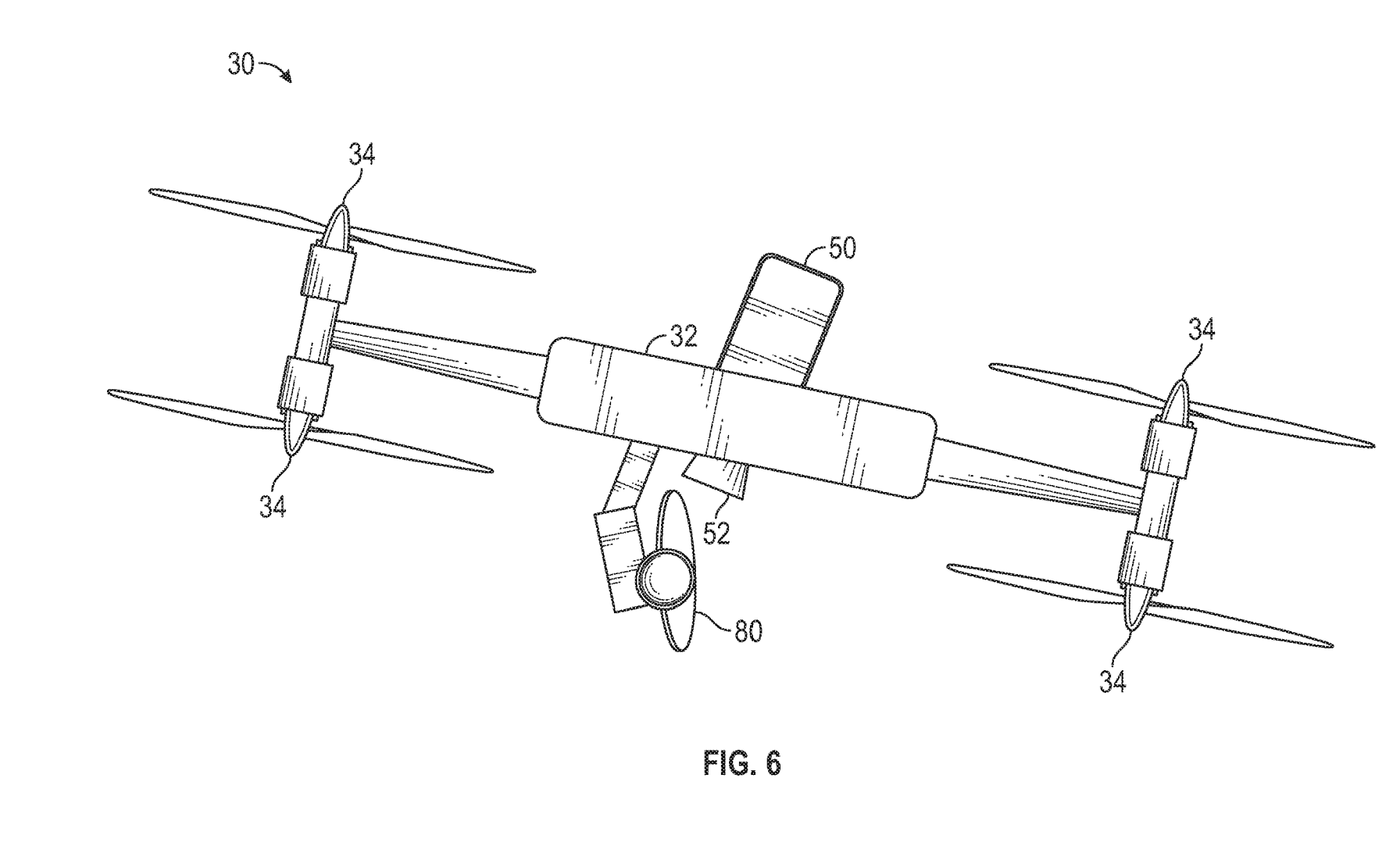
FIG. 6 is a side view of the vehicle of FIG. 3, according to some embodiments of the subject technology.
Figure 7:
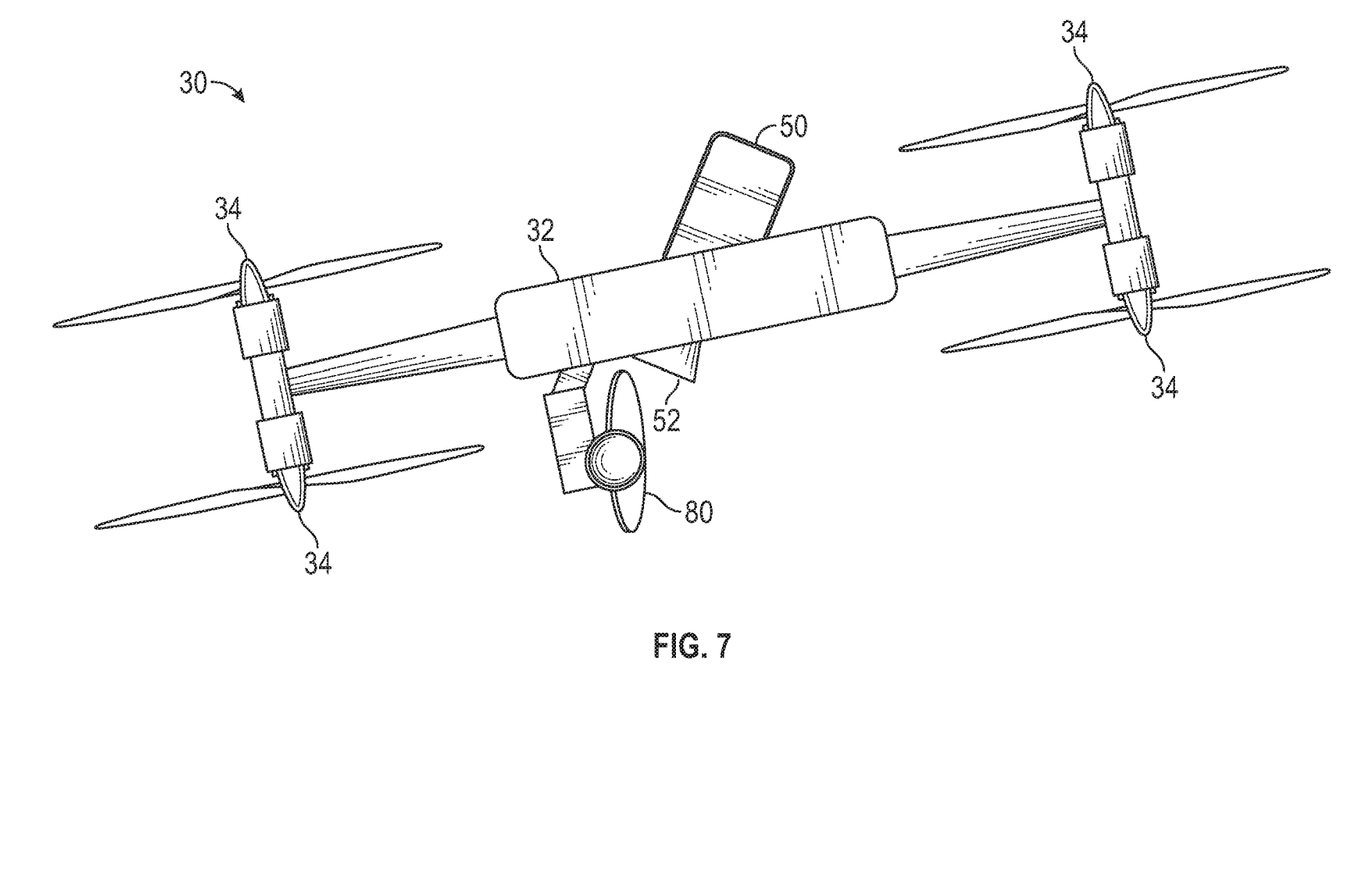
FIG. 7 is a side view of the vehicle of FIG. 3, according to some embodiments of the subject technology.

According to some embodiments, for example as shown in FIGS. 6 and 7, the camera assembly 50 can be stabilized to capture a desired image. During operation, the platform 32 of the vehicle 30 may tilt in one or more axes due to operation of the propellers 34, external forces (e.g., turbulence), and/or other factors. The camera assembly 50 can maintain or achieve a given orientation with respect to the ground, regardless of its orientation with respect to the platform 32. The control mechanisms, described further herein, can consider input from sensors as well as anticipated events due to activity of the vehicle 30 (e.g., propellers 34) to compensate for motion of the platform 32.

Figure 8:
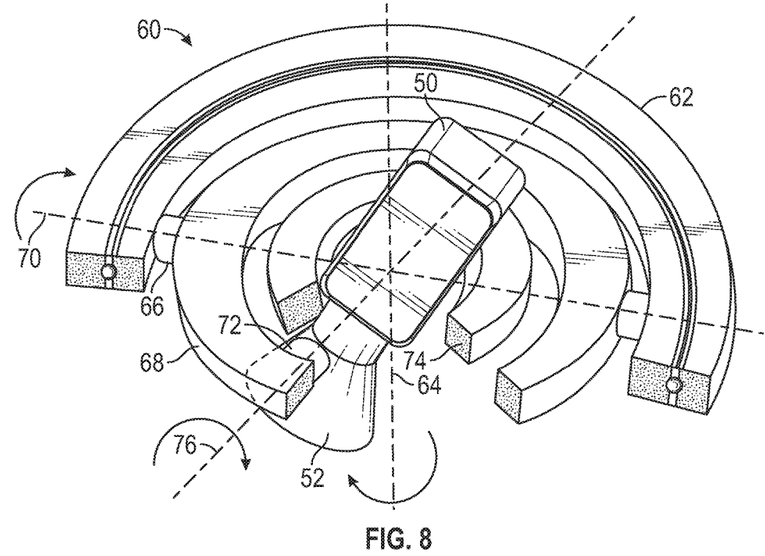
FIG. 8 is a perspective view of a camera assembly of the vehicle of FIG. 3, according to some embodiments of the subject technology.

According to some embodiments, for example as shown in FIG. 8, the camera assembly 50 can be controlled and/or adjusted by a gimbal assembly 60. The gimbal assembly 60 can rotate the camera assembly 50, including the camera 52, about one or more axes. The gimbal assembly 60 can include frames that are interconnected and nested, such that inner frames rotate at least partially within outer frames. The frames can include a yaw frame 62, a roll frame 68, and a pitch frame 74. Motors or other mechanical rotation and/or actuation devices can be provided to achieve the desired rotation. The yaw frame 62 can include a bearing for allowing an inner portion of the yaw frame 62 to rotate with respect to an outer portion of the yaw frame 62 and/or the platform 32. A yaw motor (not shown) can rotate the yaw frame 62 so that the camera assembly 50 rotates about a camera yaw axis 64. A roll motor 66 can rotate the roll frame 68 and the camera assembly 50 about a camera roll axis 70. A pitch motor 72 can rotate the pitch frame 74 and the camera assembly 50 about a camera pitch axis 76. The axes can be mutually orthogonal. The axes can intersect the camera assembly 50 and/or a center of mass of the camera assembly 50. The center of mass of the camera assembly 50 can be different than a center of mass of the mirror 80. One or more of the camera axes (e.g., camera yaw axis 64, camera roll axis 70, and camera pitch axis 76) can be different than the mirror axes (e.g., mirror pitch axis 84, mirror yaw axis, and mirror roll axis). One or more of the camera axes (e.g., camera yaw axis 64, camera roll axis 70, and camera pitch axis 76) can intersect at a first location, and the mirror axes (e.g., mirror pitch axis 84, mirror yaw axis, and mirror roll axis) can intersect at a second location, different than the first location, and/or the mirror axes do not intersect the first location.

In a nested configuration, such as that shown in FIG. 8, rotation of a given frame can rotate any or all frames nested within the given frame. While the frames are shown in the nested configuration of FIG. 8, it will be appreciated that other configurations are possible, including a different arrangement of inner and outer nested frames. The camera assembly 50 can be rotatable about any number of axes. The gimbal assembly 60 can provide rotation of the camera assembly 50 about one, two, three, or more than three axes.

According to some embodiments, the gimbal assembly 60 can provide two axes of rotation, and the mirror assembly 90 can provide two different axes of rotation. For example, the gimbal assembly 60 can omit the yaw frame 62 that rotates the camera assembly 50 about the camera yaw axis 64. The mirror assembly 90 can include a yaw motor (not shown) that controls the orientation of the mirror 80 in a mirror yaw axis (not shown). The mirror yaw axis can be orthogonal to the mirror pitch axis 84 and can intersect the mirror 80 and/or a center of mass of the mirror 80.

Figure 9:
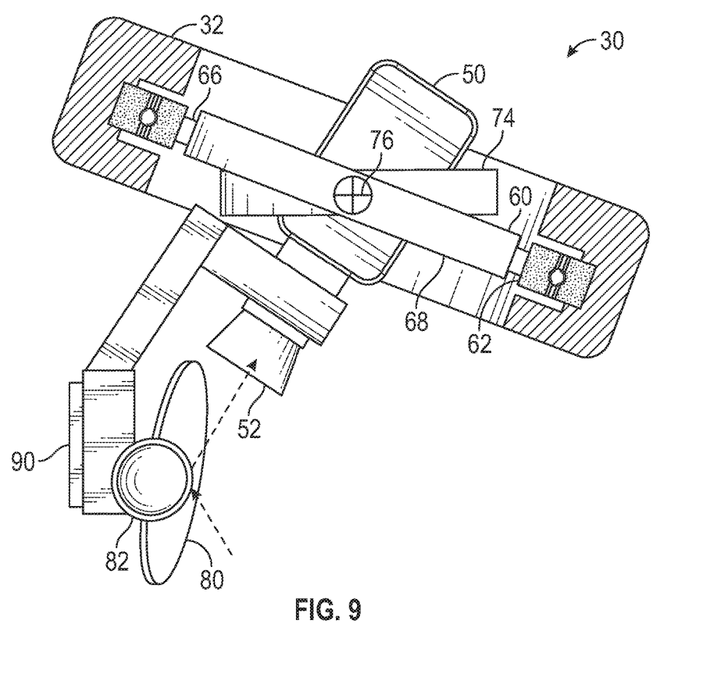
FIG. 9 is a side view of a camera assembly of the vehicle of FIG. 3, according to some embodiments of the subject technology.

The gimbal assembly 60 and the mirror assembly 90 can be operated in concert to direct and stabilize the camera 52 and the mirror 80 to capture a desired view. According to some embodiments, for example as shown in FIG. 9, the camera assembly 50 can maintain or achieve a given orientation with respect to the ground, regardless of its orientation with respect to the platform 32. For example, the roll frame 68 and/or the pitch frame 74 can rotate the camera assembly 50 so that the camera assembly 50 is stabilized with respect to the ground. For example, the roll frame 68 and/or the pitch frame 74 can maintain a consistent orientation (e.g., parallel) with respect to the ground even when the platform 32 tilts with respect to the ground. The yaw frame 62 can also rotate to allow alignment to be achieved via rotation of the roll frame 68 and/or the pitch frame 74. These adjustments can be made without requiring contributions or compensation from the platform (e.g., by operation of the propellers). For example, the gimbal assembly 60 and the mirror assembly 90 can stabilize the camera assembly so that the pilot of the vehicle 30 can maneuver as desired without sacrificing stability of the camera.

Figure 10:
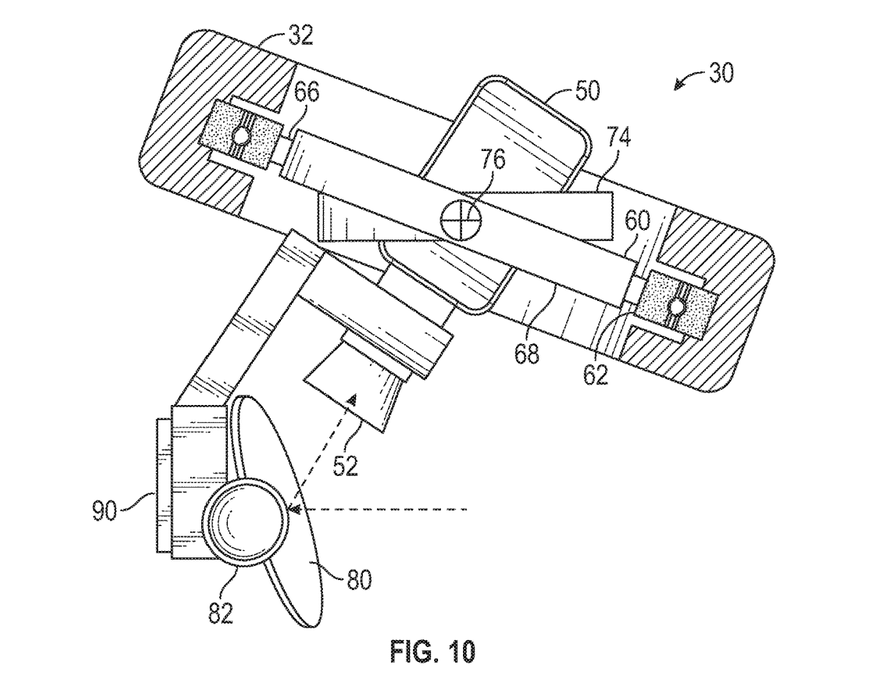
FIG. 10 is a side view of a camera assembly of the vehicle of FIG. 3, according to some embodiments of the subject technology.

According to some embodiments, for example as shown in FIG. 10, the mirror assembly 90 can reflect a view with a desired elevational alignment (i.e., vertical pan). For example, the mirror pitch motor 82 can rotate the mirror 80 to change an elevation of the reflected view. The pitch orientation can be a product of both the rotation of the pitch frame 74 about the camera pitch axis 76 and the rotation of the mirror 80 about the mirror pitch axis 84. Accordingly, either or both of the pitch frame 74 and the mirror 80 can rotate to adjust the elevation (i.e., vertical pan) of the view. Control systems can be provided to coordinate both types of rotation, as described herein. Because the mass of the mirror 80 can be lower than the mass of the camera assembly 50, rotation of the mirror 80 may be more rapid than rotation of the camera assembly 50. If pitch adjustment is desired, rotation of the mirror 80 by the mirror pitch motor 82 can be performed to achieve the desired view until the pitch motor 72 is able to rotate pitch frame 74 to a desired position, allowing the mirror pitch motor 82 to return to another position.

Figure 11:
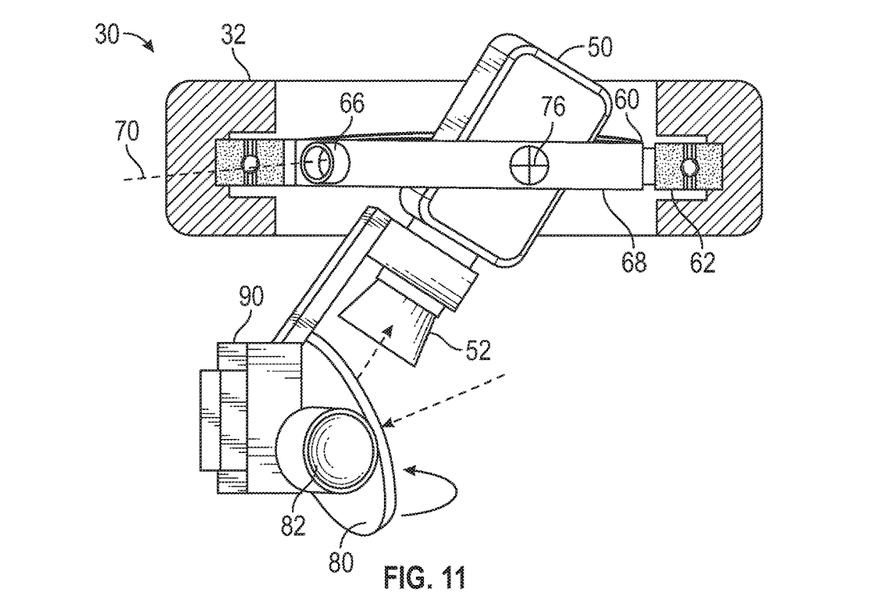
FIG. 11 is a side view of a camera assembly of the vehicle of FIG. 3, according to some embodiments of the subject technology.

According to some embodiments, for example as shown in FIG. 11, the mirror assembly 90 can reflect a view with a desired panoramic alignment (i.e., horizontal pan). For example, the yaw frame 62 can rotate the camera assembly 50 to change a horizontal direction of the reflected view. The yaw orientation can be a product of both the rotation of the yaw frame 62 about the camera yaw axis 64 and the rotation of the platform 32 (e.g., by operation of the vehicle 30 in space). Accordingly, either or both of the yaw frame 62 and the platform 32 can rotate to adjust the panoramic alignment (i.e., horizontal pan) of the view. Control systems can be provided to coordinate both types of rotation, as described herein. Because the mass of the camera assembly 50 can be lower than the mass of the vehicle 30, rotation of the camera assembly 50 may be more rapid than rotation of the vehicle 30. If yaw adjustment is desired, rotation of the camera assembly 50 can be performed to achieve the desired view until the propellers 34 are able to rotate the platform 32 to a desired position, allowing the camera assembly 50 to return to another position. Alternatively or in combination, a mirror yaw motor (not shown) can rotate the mirror 80 with respect to the camera 52 to contribute to the yaw alignment.

Figure 12:
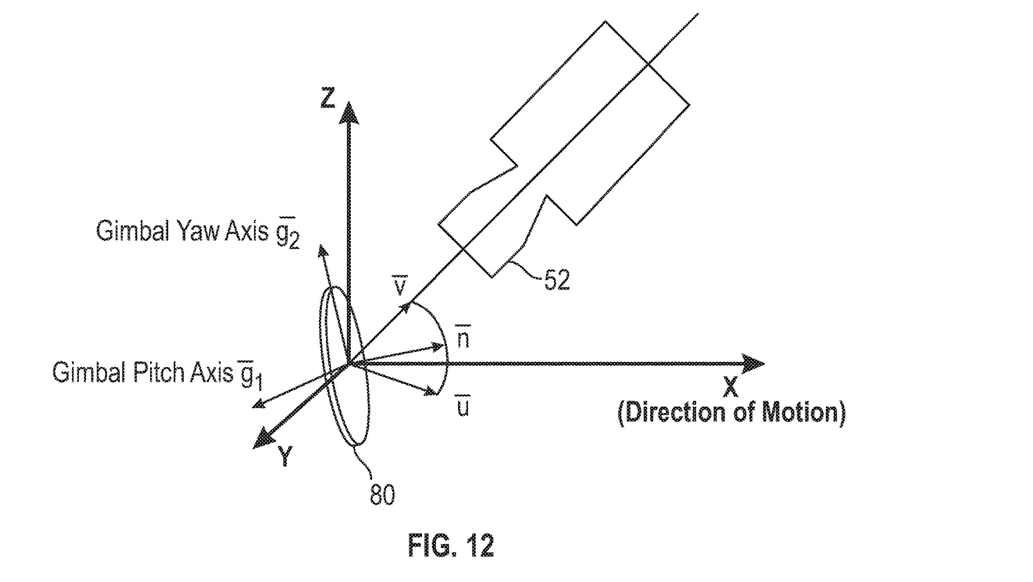
FIG. 12 is a schematic view of a camera and mirror in a coordinate axis, according to some embodiments of the subject technology.

Orientation of the mirror 80 relative to the camera 52 can be defined mathematically for processing by a control system. According to some embodiments, for example as shown in FIG. 12, the camera 52 and the mirror can have relative positions within a coordinate system defined by an X-axis, a Y-axis, and a Z-axis. The intersection of the optical axis of the camera 52 and the mirror 80 can be the origin of the coordinate system. The orientation of the mirror 80 can be determined based on at least a gimbal pitch axis, $g_1$, and a gimbal yaw axis, $g_2$. A normal vector, n, can extend perpendicularly from the surface of the mirror 80 (e.g., from the origin). An incoming vector, u, can extend away from the mirror 80 (e.g., from the origin). A reflection vector, v, can extend along the optical axis from the mirror 80 (e.g., from the origin) toward the camera 52.

The reflection vector, v, can be characterized as:

$$\bar{v} = (2\overline{nn} - 1)\bar{u} \text{(dyadic form)}$$

$$V = (2NN^T - I)U \text{(matrix form)} \qquad \text{(Eq 1)}$$

Figure 13:
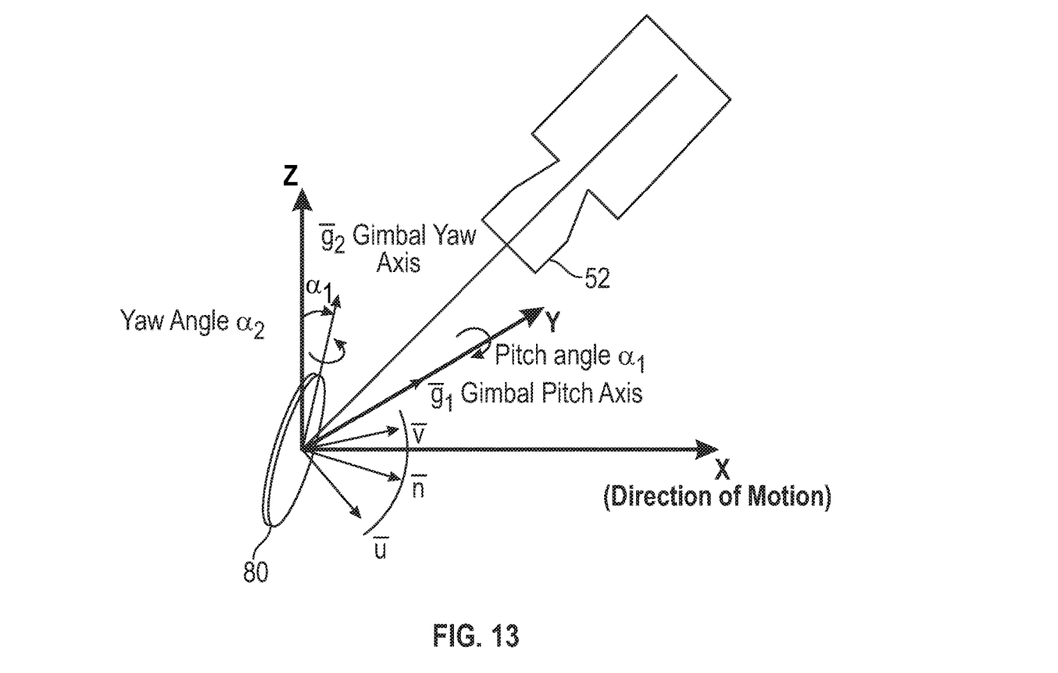
FIG. 13 is a schematic view of the camera and mirror of FIG. 12, according to some embodiments of the subject technology.

According to some embodiments, for example as shown in FIG. 13, rotation of the mirror 80 about the gimbal pitch axis, $g_1$, produces a pitch angle, $\alpha_1$. Rotation of the mirror 80 about the gimbal pitch axis, $g_2$, produces a pitch angle, $\alpha_2$. A rotation matrix, N, can be characterized as:

$$N = \begin{vmatrix} \cos \alpha_1 & \cos \alpha_2 \\ \sin \alpha_2 \\ -\sin \alpha_1 & \cos \alpha_2 \end{vmatrix} \qquad \text{(Eq. 2)}$$

For simplicity, the following variables can be assigned:

$$C_1 = \cos \alpha_1 \quad S_1 = \sin \alpha_1$$

$$C_2 = \cos \alpha_2 \quad S_2 = \sin \alpha_2 \qquad \text{(Eq. 3)}$$

Using these variables, the rotation matrix, N, can be characterized as:

$$N = \begin{vmatrix} C_1 C_2 \\ S_2 \\ -S_1 C_2 \end{vmatrix} \qquad \text{(Eq. 4)}$$

A reflection matrix, R, is given by:

$$R = 2NN^T - I = \begin{vmatrix} 2C_1^2 C_2^2 - 1 & 2S_2 C_1 C_2 & -2S_1 C_1 C_2^2 \\ 2S_2 C_1 C_2 & 2S_2^2 - 1 & -2S_1 S_2 C_1 \\ -2S_1 C_1 C_2^2 & -2S_1 S_2 C_2 & 2S_1^2 C_2^2 - 1 \end{vmatrix} \qquad \text{(Eq. 5)}$$

Given that v is always aligned with the camera 52, the following is given:

$$V \cong \begin{vmatrix} 1/\sqrt{2} \\ 0 \\ 1/\sqrt{2} \end{vmatrix} U = \begin{vmatrix} (2C_1^2 C_2^2 - 1)/\sqrt{2} - \sqrt{2} S_1 C_1 C_2^2 \\ \sqrt{2} S_2 C_1 C_2 - \sqrt{2} S_1 S_2 C_2 \\ -\sqrt{2} S_1 C_1 C_2^2 + (2S_1^2 C_2^2 - 1)/\sqrt{2} \end{vmatrix} \qquad \text{(Eq. 6)}$$

Figure 14:
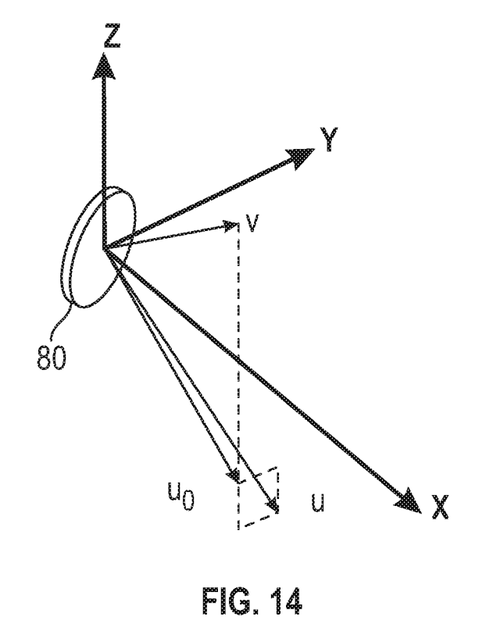
FIG. 14 is a schematic view of the mirror of FIG. 12, according to some embodiments of the subject technology.

According to some embodiments, for example as shown in FIG. 14, small pitch and yaw angles can by produced by adjustments from an initial position, $u_0$, to a final position, u. The following is given:

$$U \cong \begin{vmatrix} 1/\sqrt{2} - \sqrt{2} \; \alpha_1 \\ +\sqrt{2} \; \alpha_2 \\ -\sqrt{2} \; \alpha_1 - 1\sqrt{2} \end{vmatrix} \quad \text{(Eq. 7)}$$

Base on the rotation of the mirror 80, the image motion in the focal plane of the camera 52 can be characterized as:

$$da_{pitch} = -2\alpha_1$$

$$da_{yaw} = -\alpha_2 \quad \text{(Eq. 8)}$$

It will be recognized that the relationships described herein can be expressed in other ways and that more of fewer factors can be considered to produce solutions.

Figure 15:
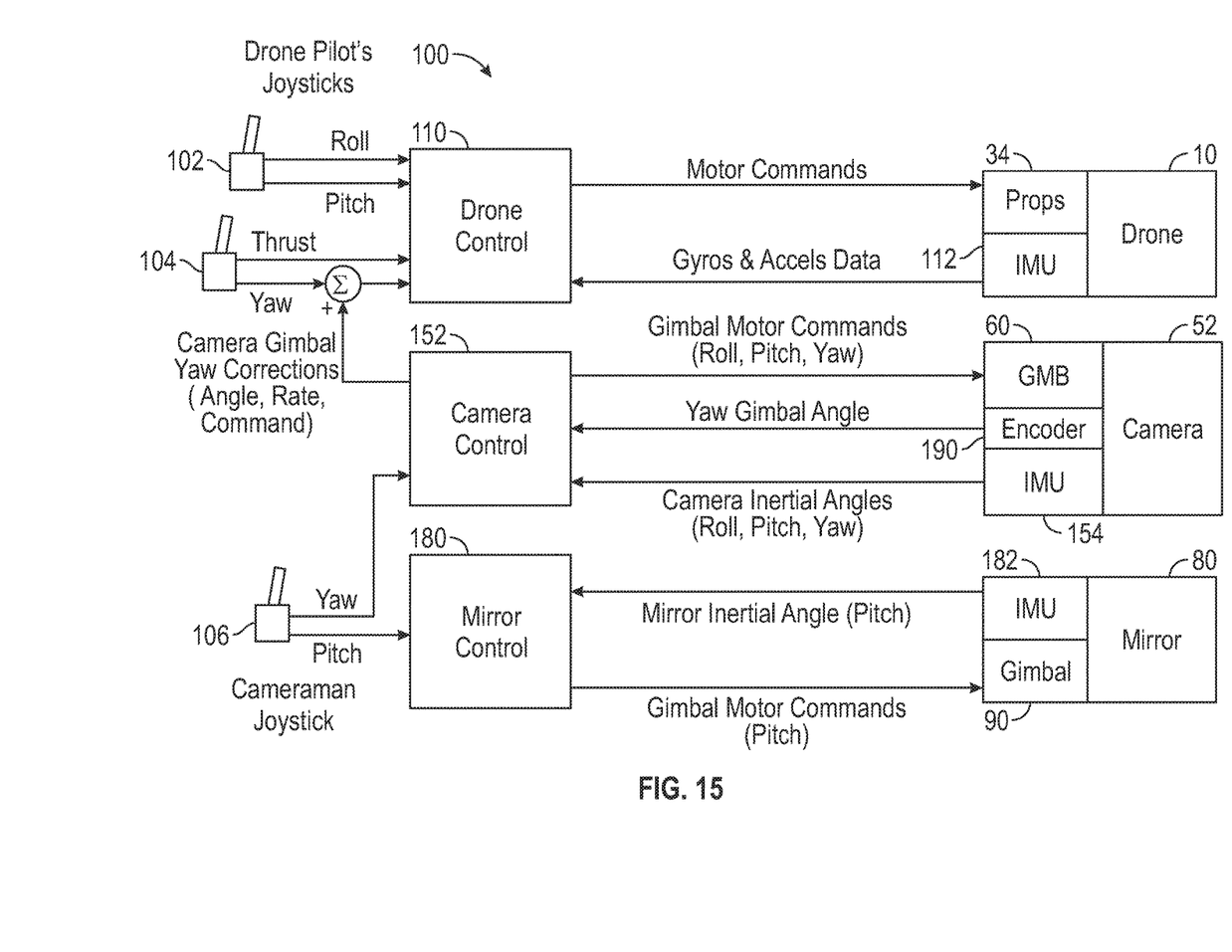
FIG. 15 is a block diagram of a control system, according to some embodiments of the subject technology.

Based on the above-described relationships, control of the camera assembly 50 and the mirror assembly 90 can be performed to capture a desired image. According to some embodiments, for example as shown in FIG. 15, a control system 100 can include input devices to provide input signals to control units for operating the vehicle, the camera assembly, and the mirror assembly. Control units, such as a vehicle control 110, a camera control 152, and a mirror control 180, are provided onboard the vehicle 30 or apart from and in communication with the vehicle 30 to control operation of the vehicle operating parameters. Communication can be provided between the input devices, the controls, and the vehicle components. Wired or wireless communication can be provided by appropriate components and based on applicable protocols.

One or more pilot input devices (e.g., joysticks) can be provided to allow a pilot to directly control or influence flight parameters, such as the roll, pitch, thrust, and/or yaw of the vehicle 30. Separate pilot input devices 102 and 104 can be provided to receive different inputs from the pilot, as shown in FIG. 15. Some input signals, such as yaw inputs, can be combined with input signals from the camera control 152, so that the desired yaw orientation of both the camera 52 and the vehicle 30, as input by the pilot and a cameraman, respectively, are simultaneously achieved. Alternatively, input signals from the pilot input devices 102 and/or 104 can be maintained separate from any input signals from the camera control 152 so the vehicle 30 and the camera 52 are controlled independently.

The vehicle control 110 can receive input signals and generate command signals that are transmitted to the vehicle 30. For example, input signals from the pilot input devices 102 and 104 can be translated into appropriate command signals that alter operation of the propellers 34 to achieve the result indicated by the input signal (e.g., motion of the vehicle). The vehicle 30 can include a vehicle inertial measurement unit ("IMU") 112 that provides information regarding a characteristic of the vehicle 30, such as inertial angles thereof. For example, the vehicle IMU 112 can include a six-degrees of freedom IMU that calculates the vehicle's position, velocity, and/or acceleration based on six degrees of freedom (x, y, z, $\theta_x$, $\theta_y$, and $\theta_z$). The vehicle IMU 112 can include one or more of an accelerometer, a gyroscope, and/or a magnetometer. The vehicle IMU 112 can provide data to the vehicle control 110 for processing in combination with the input signals to generate and/or refine the command signals.

A cameraman input device (e.g., joystick) 106 can be provided to allow a cameraman to directly control or influence imaging parameters, such as the source of the image to be captured by the camera 52. Some input signals, such as yaw inputs, are directed to the camera control 152. Other input signals, such as pitch inputs are directed to the mirror control 180.

The camera control 152 can receive input signals and generate command signals that are transmitted to the gimbal assembly 60. For example, input signals from the input device 106 can be translated into appropriate command signals that alter operation of the gimbal assembly 60 to achieve the result indicated by the input signal (e.g., yaw adjustment of image). A camera IMU 154 can provide information regarding a characteristic of the camera 52, such as inertial angles thereof. For example, the camera IMU 154 can include a six-degrees of freedom IMU that calculates the camera's position, velocity, and/or acceleration based on six degrees of freedom (x, y, z, $\theta_x$, $\theta_y$, and $\theta_z$). The camera IMU 154 can include one or more of an accelerometer, a gyroscope, and/or a magnetometer. The camera IMU 154 can provide data to the camera control 152 for processing in combination with the input signals to generate and/or refine the command signals. An encoder 190 can also be included to process yaw signals from the pilot and the cameraman, as described further herein.

The mirror control 180 can receive input signals and generate command signals that are transmitted to the mirror assembly 90. For example, input signals from the input device 106 can be translated into appropriate command signals that alter operation of the mirror assembly 90 to achieve the result indicated by the input signal (e.g., pitch adjustment of image). A mirror IMU 182 can provide information regarding a characteristic of the mirror 80, such as inertial angles thereof. For example, the mirror IMU 182 can include a six-degrees of freedom IMU that calculates the mirror's position, velocity, and/or acceleration based on six degrees of freedom (x, y, z, $\theta_x$, $\theta_y$, and $\theta_z$). The mirror IMU 182 can include one or more of an accelerometer, a gyroscope, and/or a magnetometer. The mirror IMU 182 can provide data to the mirror control 180 for processing in combination with the input signals to generate and/or refine the command signals.

Figure 16:
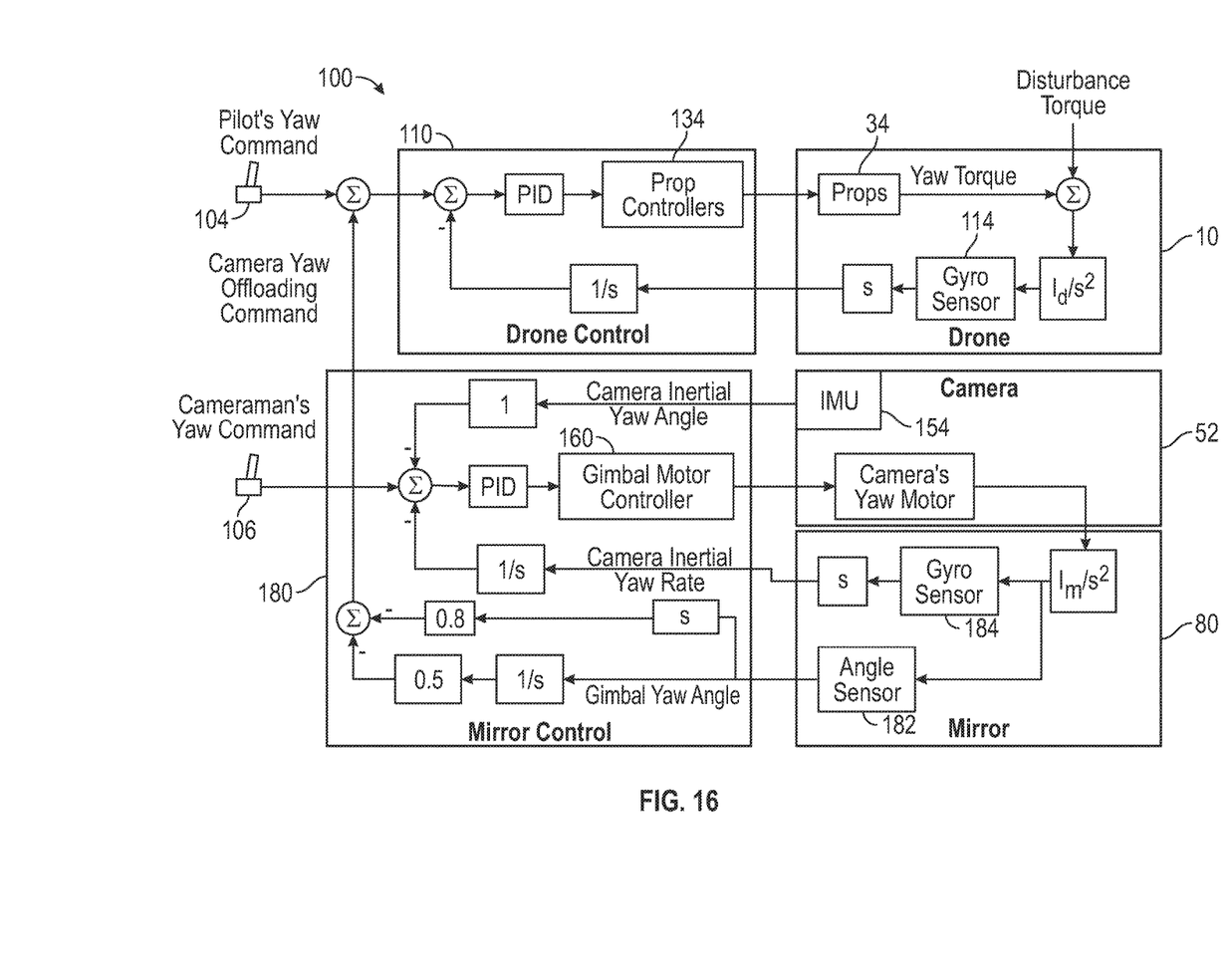
FIG. 16 is a block diagram of the control system of FIG. 15, according to some embodiments of the subject technology.

According to some embodiments, for example as shown in FIG. 16, some pilot input signals, such as yaw inputs, can be combined with cameraman input signals, and the desired yaw orientation of both the camera 52 and the vehicle 30 can be controlled based on these inputs. The diagram of FIG. 16 shows how the vehicle control 110 and the mirror control 180 combine inputs from the pilot input device 104 and the cameraman input device 106 with inputs from the vehicle 30. The outputs of the vehicle control 110 and the mirror control 180 are products of linear combinations of the position error, the integrated position error, and the rate of change of the position error. The "s" variable represents a conventional variable of a Laplace transform and indicates a differentiation operation, while "1/s" indicates an integration operation. The "$1/s^2$" variable represents a double integration operation. The parameter "$I_d$" represents the inertia of the vehicle about the yaw axis, and the parameter "$I_m$" represents the inertia of the mirror. The numerical values appearing in various boxes of the diagram (such as 2, 0.3, 0.9 etc) represent the gains used in the control equations. The signals can be combined as shown in FIG. 16. For example input signals, such as inputs from the pilot input device 104, can be combined with input signals from the mirror control 180. Alternatively, input signals from the pilot input device 104 can be maintained separate from input signals from the mirror control 180.

Various examples of aspects of the disclosure are described below as clauses for convenience. These are provided as examples, and do not limit the subject technology.

Clause A. An aircraft comprising: a platform; a camera assembly rotatable relative to the platform and about three camera axes, the camera assembly comprising: a camera; and a mirror attached to the camera, wherein the mirror is rotatable relative to the camera and about a mirror axis, different from the three camera axes.

Clause B. An imaging device comprising: a camera assembly rotatable relative to a platform and about three camera axes, the camera assembly comprising: a camera; and a mirror attached to the camera, wherein the mirror is rotatable relative to the camera and about a mirror axis, different from the camera axes.

Clause C. A method, comprising: rotating a camera assembly relative to a platform and about three camera axes, the camera assembly comprising: a camera; and a mirror attached to the camera; and rotating the mirror relative to the camera and about a mirror axis, different from the camera axes; and with the camera, capturing an image of a view reflected by the mirror.

Clause D. An imaging device comprising: a camera assembly rotatable relative to a platform and about two camera axes, the camera assembly comprising: a camera; and a mirror attached to the camera, wherein the mirror is rotatable relative to the camera and about two mirror axes, different from the camera axes.

One or more of the above clauses can include one or more of the features described below.

A gimbal assembly can be provided for rotating the camera assembly about the three camera axes. A mirror gimbal can be provided for rotating the camera assembly about the mirror axis. The camera can be oriented to capture an image reflected by the mirror. The three camera axes can intersect at a center of mass of the camera assembly. The mirror axis can intersect a center of mass of the mirror. The three camera axes can intersect at a first location and the mirror axis does not intersect the first location. A first inertial measurement unit can be provided to measure inertial angles of the camera assembly. A second inertial measurement unit can be provided to measure inertial angles of the mirror.

A vehicle controller can be provided for receiving input signals from a user and sending command signals to propulsion devices of the aircraft. A camera controller can be provided for receiving input signals from a user and sending command signals to control rotation of the camera assembly. A mirror controller can be provided for receiving input signals from a user and sending command signals to control rotation of the mirror.

Rotating the camera assembly can include rotating the camera assembly with an assembly gimbal. Rotating the mirror can include rotating the mirror with a mirror gimbal. Receiving a command from a user can be performed, wherein rotating the camera assembly and rotating the mirror are in response to the command. Rotating the camera assembly can be in response to a command from a user, and wherein rotating the mirror is to compensate for errors while rotating the camera assembly. Rotating a vehicle bearing the camera assembly can be performed. Rotating the mirror can be in response to a command from a user to capture a new reflected view, and wherein rotating the vehicle is after rotating the mirror and while the mirror is further rotated to maintain the new reflected view. Rotating the vehicle can be in response to a command from a user, and wherein rotating the mirror is to compensate for errors while rotating the vehicle.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An aircraft comprising:
a platform;
a camera assembly rotatable relative to the platform and about three camera axes, the camera assembly comprising:
a camera; and
a mirror attached to the camera, wherein the mirror is rotatable relative to the camera and about a mirror axis, different from the three camera axes;
a first inertial measurement unit configured to measure inertial angles of the camera assembly; and
a second inertial measurement unit configured to measure inertial angles of the mirror.

2. The aircraft of claim 1, further comprising a gimbal assembly for rotating the camera assembly about the three camera axes.

3. The aircraft of claim 1, further comprising a mirror gimbal for rotating the mirror about the mirror axis.

4. The aircraft of claim 1, wherein the camera is oriented to capture an image reflected by the mirror.

5. The aircraft of claim 1, wherein the three camera axes intersect at a first location and the mirror axis does not intersect the first location.

6. The aircraft of claim 1, further comprising:
a vehicle controller for receiving input signals from a user and sending command signals to devices for controlling propulsion and/or orientation of the aircraft;
a camera controller for receiving input signals from a user and sending command signals to control rotation of the camera assembly; and
a mirror controller for receiving input signals from a user and sending command signals to control rotation of the mirror.

7. An aircraft comprising:
a platform; and
a camera assembly rotatable relative to the platform and about three camera axes, the camera assembly comprising:
a camera; and
a mirror attached to the camera, wherein the mirror is rotatable relative to the camera and about a mirror axis, different from the three camera axes, wherein the three camera axes intersect at a center of mass of the camera assembly.

8. An aircraft comprising:
a platform; and
a camera assembly rotatable relative to the platform and about three camera axes, the camera assembly comprising:
a camera; and
a mirror attached to the camera, wherein the mirror is rotatable relative to the camera and about a mirror axis, different from the three camera axes, wherein the mirror axis intersects a center of mass of the mirror.

9. An imaging device comprising:
a camera assembly rotatable relative to a platform and about three camera axes, the camera assembly comprising:
a camera; and
a mirror attached to the camera, wherein the mirror is rotatable relative to the camera and about a mirror axis, different from the camera axes, wherein the three camera axes intersect at a first location and the mirror axis does not intersect the first location.

10. The imaging device of claim 9, further comprising a gimbal assembly for rotating the camera assembly about the three camera axes.

11. The imaging device of claim 9, further comprising a mirror gimbal for rotating the mirror about the mirror axis.

12. The imaging device of claim 9, wherein the three camera axes intersect at a center of mass of the camera assembly.

13. The imaging device of claim 9, wherein the mirror axis intersects a center of mass of the mirror.

14. The imaging device of claim 9, wherein the three camera axes intersect at a first location and the mirror axis does not intersect the first location.

15. A method of operating a vehicle, the method comprising:

receiving a command at the vehicle, the vehicle comprising a platform and a camera assembly, the camera assembly being rotatable relative to a platform of the vehicle and about three camera axes, the camera assembly comprising a camera and a mirror attached to the camera, wherein the command is to capture a view reflected by the mirror;

in response to the command, rotating the mirror relative to the camera and about a mirror axis, different from the camera axes, to obtain the view;

after rotating the mirror, rotating the vehicle and further rotating the mirror to maintain the view; and with the camera, capturing an image of the view reflected by the mirror.

16. The method of claim 15, wherein rotating the mirror comprises rotating the mirror with a mirror gimbal.

17. The method of claim 15, further comprising rotating the camera assembly in response to the command.

18. The method of claim 15, further comprising rotating the camera assembly in response to the command, and wherein rotating the mirror is to compensate for errors while rotating the camera assembly.

19. The method of claim 15, wherein further rotating the mirror is to compensate for errors while rotating the vehicle.

20. The method of claim 15, wherein the three camera axes intersect at a first location and the mirror axis does not intersect the first location.

* * * * *